US012527828B2

(12) United States Patent
Wang et al.

(10) Patent No.: US 12,527,828 B2
(45) Date of Patent: Jan. 20, 2026

(54) TRADITIONAL CHINESE MEDICINE COMPOSITION FOR RECOVERY PHASE OF EXOGENOUS FEVER, PREPARATION METHOD THEREFOR AND APPLICATION THEREOF

(71) Applicant: BEIJING UNIVERSITY OF CHINESE MEDICINE THIRD AFFILIATED HOSPITAL, Beijing (CN)

(72) Inventors: Chengxiang Wang, Beijing (CN); Hongsheng Cui, Beijing (CN); Weiheng Chen, Beijing (CN); Huiyong Yu, Beijing (CN); Jianjun Wu, Beijing (CN)

(73) Assignee: BEIJING UNIVERSITY OF CHINESE MEDICINE THIRD AFFILIATED HOSPITAL, Beijing (CN)

(*) Notice: Subject to any disclaimer, the term of this patent is extended or adjusted under 35 U.S.C. 154(b) by 646 days.

(21) Appl. No.: 17/914,407

(22) PCT Filed: Mar. 25, 2021

(86) PCT No.: PCT/CN2021/083060
§ 371 (c)(1),
(2) Date: Feb. 15, 2023

(87) PCT Pub. No.: WO2021/190611
PCT Pub. Date: Sep. 30, 2021

(65) Prior Publication Data
US 2023/0293616 A1    Sep. 21, 2023

(30) Foreign Application Priority Data

Mar. 26, 2020 (CN) .......................... 202010222290.X
Mar. 18, 2021 (CN) .......................... 202110291559.4

(51) Int. Cl.
| *A61K 36/344* | (2006.01) |
| *A61K 36/076* | (2006.01) |
| *A61K 36/284* | (2006.01) |
| *A61K 36/346* | (2006.01) |
| *A61K 36/484* | (2006.01) |
| *A61K 36/535* | (2006.01) |
| *A61K 36/605* | (2006.01) |
| *A61K 36/73*  | (2006.01) |
| *A61K 36/736* | (2006.01) |
| *A61K 36/79*  | (2006.01) |
| *A61K 36/8968*| (2006.01) |

(52) U.S. Cl.
CPC .......... *A61K 36/344* (2013.01); *A61K 36/076* (2013.01); *A61K 36/284* (2013.01); *A61K 36/346* (2013.01); *A61K 36/484* (2013.01); *A61K 36/535* (2013.01); *A61K 36/605* (2013.01); *A61K 36/73* (2013.01); *A61K 36/736* (2013.01); *A61K 36/79* (2013.01); *A61K 36/8968* (2013.01); *A61K 2236/15* (2013.01); *A61K 2236/39* (2013.01)

(58) Field of Classification Search
None
See application file for complete search history.

(56) References Cited

FOREIGN PATENT DOCUMENTS

| CN | 1362233   | 8/2002 |
| CN | 105477480 | 4/2016 |
| CN | 111249391 | 6/2020 |

OTHER PUBLICATIONS

Lei (CN 105497364 A—English translation)—2016.*
Zhao (CN 103920106 A—English translation)—2014.*
Zhen et al, "Clinical Observation of Ginseng-Schisandra Decoction in the Treatment of Post-Infection Spleen Deficiency Syndrome in Pediatric Patients," The Journal of Practical Medicine, vol. 18, No. 4, p. 439, 2002.
"Expert Guidance on a Comprehensive Chinese Traditional Medicine Intervention Program for the Recovery Period of Novel Coronavirus Pneumonia" Beijing Journal of Traditional Chinese Medicine. vol. 39, No. 2, pp. 102-103. 2020.

(Continued)

*Primary Examiner* — Susan Hoffman
(74) *Attorney, Agent, or Firm* — McDonald Hopkins LLC

(57) ABSTRACT

A traditional Chinese medicine composition for recovery phase of exogenous fever and a preparation method therefor. The traditional Chinese medicine composition comprises the following raw materials: radix codonopsis, rhizoma atractylodis macrocephalae, poria cocos, radix ophiopogonis, schisandra chinensis, hairyvein agrimony, perilla seeds, cortex morinadicis, folium eriobotryae, radix platycodi, apricot kernels, and radix glycyrrhizae. According to the monarch, minister, assistant and guide theory of traditional Chinese medicines, the radix codonopsis is used as a monarch drug; fried rhizoma atractylodis macrocephalae, the poria cocos, the radix ophiopogonis, the schisandra chinensis, and the hairyvein agrimony are used as minister drugs; the perilla seeds, the cortex morinadicis, and the folium eriobotryae are used as assistant drugs; and the radix platycodi, the apricot kernels, and the radix glycyrrhizae are used as guide drugs. Also disclosed is use of the traditional Chinese medicine composition for rehabilitation treatment of novel coronavirus pneumonia and other exogenous fever in the recovery phase.

3 Claims, No Drawings

(56) References Cited

OTHER PUBLICATIONS

Patent Cooperation Treaty (PCT), International Search Report and Written Opinion for Application PCT/CN2021/083060 filed on Mar. 25, 2021, mailed Jun. 9, 2021, International Searching Authority, CN.
State Intellectual Property Office of People's Republic of China, Notification of First Office Action for Application No. 202110291559.4, China, 2021.
State Intellectual Property Office of People's Republic of China, Notification of Second Office Action for Application No. 202110291559.4, China, 2022.

\* cited by examiner

TRADITIONAL CHINESE MEDICINE COMPOSITION FOR RECOVERY PHASE OF EXOGENOUS FEVER, PREPARATION METHOD THEREFOR AND APPLICATION THEREOF

TECHNICAL FIELD

The present application belongs to the field of traditional Chinese medicine and specifically relates to a traditional Chinese medicine composition, a preparation method therefor and use thereof and, in particular, to a traditional Chinese medicine composition for a recovery phase of a fever disease caused by an exogenous pathogenic factor, a preparation method therefor and use thereof.

BACKGROUND

A fever diseases caused by an exogenous pathogenic factor is a type of disease caused by the invasion of a human body by exogenous pathogens and with fever as its main symptom. Such diseases are mainly acute infectious diseases in modern medicine and include diseases caused by bacteria or viruses and with fever as the main symptom.

Traditional Chinese medicine holds that the fever disease caused by an exogenous pathogenic factor is a process in which the right Qi of a human body fiercely fights against warm-heat pathogens and the heat disease is treated when the right Qi of the human body gradually defeats the pathogens through the differentiation of symptoms and signs, the elimination of pathogens and the support of right Qi. In the process, due to damages of the pathogens to the right Qi, different degrees of injuries are inevitably caused to viscera, tissues and organs as the dysfunction and depletion of channels and collaterals and Qi-blood-body fluids. Therefore, in the specific initial recovery phase of the heat disease, the human body should be adjusted and repaired in time and various measures should be taken for a total recovery.

Attention should be paid to the following aspects of the post-recovery treatment of the fever disease caused by an exogenous pathogenic factor: (1) mental regulation and psychological rehabilitation; (2) proper rest and body regulation; (3) residual heat removal and Yin nourishment and Qi replenishment; (4) viscera nourishment and function rehabilitation; (5) prevention and treatment of complications, sequelae and disability.

Fever is the main pathological reaction and clinical sign of the fever disease caused by an exogenous pathogenic factor. A traditional differentiation and treatment method divides the properties and features of fever into "six meridians" (six phases), "Wei-Qi-Ying-Xue" (four phases) and "triple burner" (three phases). At present, fever is distinguished by three stages: an onset stage, an exuberant heat stage and a recovery stage. Therefore, the differentiation of fever is an important basis for the treatment of the fever disease caused by an exogenous pathogenic factor. Residual heat after recovery may be caused by residual pathogens or may be caused by damages of fever to Yin fluids in the process of the heat disease, or arises inside due to the consumption of Qi with body fluids and the deficiency of both Qi and Yin. Therefore, the residual heat after recovery has its particularity in differentiation and treatment. In addition, after the heat disease is treated, attention should be paid to the treatment of fever caused by the reinfection of exogenous pathogens (that is, "reinfection" or "repeated infection" of an infectious disease) and the aggravation (relapse or reburning) of residual pathogens.

Coronavirus disease 2019 (COVID-19), which is simply referred to as "coronavirus pneumonia", refers to pneumonia caused by 2019 novel coronavirus (2019-nCoV) infection. The clinical signs of pneumonia patients with novel coronavirus infection include main signs such as fever, fatigue and dry cough, rare upper respiratory symptoms such as nasal congestion and runny nose, and a hypoxia state. About half of the patients breathe hard one week later, and severe patients rapidly progress to acute respiratory distress syndrome (ARDS), septic shock, uncorrectable metabolic acidosis and coagulopathy.

It is to be noted that patients in severe and critical cases may have moderate or low fever and even no obvious fever in the course of COVID-19. Some patients have mild symptoms, may have no fever, and mostly recover one week later. Most patients are good after recovery and a few patients become severe and even die. The discharge standards for coronavirus pneumonia include two negative throat swabs, no symptoms, normal body temperature and normal CT, followed by isolation for two weeks. People in the recovery phase who are released from isolation and reach the discharge standards can be given suitable treatment or rehabilitation guidance, so as to prevent the recurrence of the disease and reduce the harmful effects of the disease on patients.

Therefore, whether patients in the recovery phase of COVID-19 and other fever diseases caused by an exogenous pathogenic factor can receive appropriate and effective drug treatment is of great clinical significance to prevent the recurrence of diseases and improve the resistance of patients.

SUMMARY

The present application provides a traditional Chinese medicine composition for a recovery phase of a fever disease caused by an exogenous pathogenic factor, a preparation method therefor and use thereof. The traditional Chinese medicine composition regulates Qi and removes residual pathogens, integrating regulation with nourishment.

In a first aspect, the present application provides a traditional Chinese medicine composition. The traditional Chinese medicine composition includes the following raw materials: Radix Codonopsis (Dangshen), Rhizoma Atractylodis Macrocephalae (Baizhu), Poria cocos (Fuling), Radix Ophiopogonis (Maidong), Fructus Schisandrae Chinensis (Wuweizi), Herba Agrimoniae (Xianhecao), Fructus Perillae (Suzi), Cortex Mori (Sangbaipi), Folium Eriobotryae (Pipaye), Radix Platycodonis (Jiegeng), Semen Armeniacae Amarum (Xingren) and Radix Glycyrrhizae (Gancao). Preferably, the traditional Chinese medicine composition is composed of these raw materials.

The formulation of the present application is composed of 12 Chinese medicines including Radix Codonopsis, Radix Ophiopogonis, Fructus Schisandrae Chinensis, Poria cocos, roasted Rhizoma Atractylodis Macrocephalae, Semen Armeniacae Amarum, Fructus Perillae, Radix Platycodonis, Herba Agrimoniae, stir-fried Folium Eriobotryae, Cortex Mori and stir-fried Radix Glycyrrhizae. According to the theory of "monarch, minister, assistant and guide" in traditional Chinese medicine, Radix Codonopsis is used as the monarch to nourish the weakness of lung and spleen and the deficiency of Qi; roasted Rhizoma Atractylodis Macrocephalae, Poria cocos, Radix Ophiopogonis, Fructus Schisandrae Chinensis and Herba Agrimoniae are used as ministers to supplement spleen to nourish lung, supplement Yin to nourish Qi, and astringe to relieve desertion; Fructus Perillae, Cortex Mori and Folium Eriobotryae for clearing and reducing phlegm are used as assistants to clear turbid and eliminate residual pathogens; and Radix Platycodonis for upraise, Semen Armeniacae Amarum for diffuse and Radix Glycyrrhizae for harmony guide the nourishment of Qi and the smooth discharge of residual pathogens. The traditional Chinese medicine composition provided in the present application formulates indispensable components according to "monarch, minister, assistant and guide", where assistant and guide components have an important effect on the exertion of effects of monarch and minister components.

The traditional Chinese medicine composition provided in the present application can treat common symptoms such as cough, dry cough with little sputum or sticky sputum, shortness of breath, fatigue and poor appetite, dry pharynx, dry mouth and sweating, heat sensation in chest, palms and soles, weak stool or thin sloppy stool, dry pale enlarged tongue, little white and greasy tongue coating and fine slippery pulse in a recovery phase of COVID-19 and other fever diseases caused by an exogenous pathogenic factor.

Meanwhile, traditional Chinese medicine components of the traditional Chinese medicine composition of the present application collaborate with each other and exert synergistic effects. The obtained traditional Chinese medicine composition has the effects of boosting Qi, nourishing Yin and eliminating residual pathogens and mainly treats Qi and Yin deficiency and residual pathogens in the recovery phase of COVID-19 and other fever diseases caused by an exogenous pathogenic factor. Moreover, the traditional Chinese medicine composition is safe and has no toxic and side effects, and the functions of the body of a patient using the traditional Chinese medicine composition are not obviously affected.

As a preferred technical solution of the present application, the Rhizoma Atractylodis Macrocephalae is roasted Rhizoma Atractylodis Macrocephalae. Raw Rhizoma Atractylodis Macrocephalae and roasted Rhizoma Atractylodis Macrocephalae are different as a result of preparation processes. Raw Rhizoma Atractylodis Macrocephalae is bitter and sweet in taste and mild in nature and mainly has anti-oxidation, anti-aging and hypoglycemic effects, while roasted Rhizoma Atractylodis Macrocephalae has the effects of invigorating spleen, boosting Qi, drying dampness and diuresis.

Preferably, the Folium Eriobotryae is stir-fried Folium Eriobotryae. Stir-fried Folium Eriobotryae contains saponins, ursolic acid, oleanolic acid and other ingredients and has the effects of clearing lung heat and relieving cough, harmonizing stomach and inducing diuresis, and quenching thirst.

Preferably, the Radix Glycyrrhizae is stir-fried Radix Glycyrrhizae. Stir-fried Radix Glycyrrhizae is a medicinal material obtained by processing raw Radix Glycyrrhizae with honey. Stir-fried Radix Glycyrrhizae can strengthen Qi for invigorating heart and spleen and has the effects of moistening the lung and suppressing cough. A processing method for a traditional Chinese medicine also affects the performance of the traditional Chinese medicine. In the present application, the Rhizoma Atractylodis Macrocephalae is roasted, and Folium Eriobotryae and Radix Glycyrrhizae are obtained after a processing step such as stir-frying with wine or stir-frying with honey, so that the obtained traditional Chinese medicine formulation has a better effect.

As a preferred technical solution of the present application, the traditional Chinese medicine composition includes the following parts by weight of raw materials: 1-20 parts of Radix Codonopsis, 1-20 parts of Rhizoma Atractylodis Macrocephalae, 1-30 parts of Poria cocos, 1-20 parts of Radix Ophiopogonis, 1-10 parts of Fructus Schisandrae Chinensis, 1-30 parts of Herba Agrimoniae, 1-20 parts of Fructus Perillae, 1-20 parts of Cortex Mori, 1-25 parts of Folium Eriobotryae, 1-10 parts of Radix Platycodonis, 1-10 parts of Semen Armeniacae Amarum and 1-10 parts of Radix Glycyrrhizae. Preferably, the traditional Chinese medicine composition is composed of these raw materials.

Each component of the traditional Chinese medicine composition has the best effect within the above range of the number of parts by weight. The number of parts by weight of Radix Codonopsis used as the monarch is especially important. Too much is as bad as too little, and Radix Codonopsis beyond the above parts by weight affects the overall effect of the traditional Chinese medicine composition.

In the present application, the number of parts by mass of the Radix Codonopsis may be 1, 2, 3, 5, 6, 8, 10, 11, 12, 13, 14, 15, 16, 17, 18, 19 or 20, etc.

The number of parts by mass of the Rhizoma Atractylodis Macrocephalae may be 1, 2, 3, 5, 6, 8, 10, 11, 12, 13, 14, 15, 16, 17, 18, 19 or 20, etc.

The number of parts by mass of the Poria cocos may be 1, 2, 3, 5, 6, 8, 10, 11, 12, 13, 14, 15, 16, 17, 18, 19, 20, 21, 22, 24, 25, 26, 27, 28, 29 or 30, etc.

The number of parts by mass of the Radix Ophiopogonis may be 1, 2, 3, 5, 6, 8, 10, 11, 12, 13, 14, 15, 16, 17, 18, 19 or 20, etc.

The number of parts by mass of the Fructus Schisandrae Chinensis may be 1, 2, 3, 4, 5, 6, 7, 8, 9 or 10, etc.

The number of parts by mass of the Herba Agrimoniae may be 1, 2, 3, 5, 6, 8, 10, 11, 12, 13, 14, 15, 16, 17, 18, 19, 20, 21, 22, 24, 25, 26, 27, 28, 29 or 30, etc.

The number of parts by mass of the Fructus Perillae may be 1, 2, 3, 5, 6, 8, 10, 11, 12, 13, 14, 15, 16, 17, 18, 19 or 20, etc.

The number of parts by mass of the Cortex Mori may be 1, 2, 3, 5, 6, 8, 10, 11, 12, 13, 14, 15, 16, 17, 18, 19 or 20, etc.

The number of parts by mass of the Folium Eriobotryae may be 1, 2, 3, 5, 6, 8, 10, 11, 12, 13, 14, 15, 16, 17, 18, 19, 20, 21, 22, 24 or 25, etc.

The number of parts by mass of the Radix Platycodonis may be 1, 2, 3, 4, 5, 6, 7, 8, 9 or 10, etc.

The number of parts by mass of the Semen Armeniacae Amarum may be 1, 2, 3, 4, 5, 6, 7, 8, 9 or 10, etc.

The number of parts by mass of the Radix Glycyrrhizae may be 1, 2, 3, 4, 5, 6, 7, 8, 9 or 10, etc.

As a preferred technical solution of the present application, the traditional Chinese medicine composition includes the following parts by weight of raw materials:

5-15 parts of Radix Codonopsis, 5-15 parts of Rhizoma Atractylodis Macrocephalae, 10-parts of Poria cocos, 5-15 parts of Radix Ophiopogonis, 5-8 parts of Fructus Schisandrae Chinensis, 10-20 parts of Herba Agrimoniae, 5-15 parts of Fructus Perillae, 5-15 parts of Cortex Mori, 10-15 parts of Folium Eriobotryae, 5-8 parts of Radix Platycodonis, 5-8 parts of Semen Armeniacae Amarum and 5-8 parts of Radix Glycyrrhizae. Preferably, the traditional Chinese medicine composition is composed of these raw materials.

Preferably, the traditional Chinese medicine composition includes the following parts by weight of raw materials: 10 parts of Radix Codonopsis, 10 parts of roasted Rhizoma Atractylodis Macrocephalae, 15 parts of Poria cocos, 10 parts of Radix Ophiopogonis, 6 parts of Fructus Schisandrae Chinensis, 15 parts of Herba Agrimoniae, 10 parts of Fructus Perillae, 10 parts of Cortex Mori, 12 parts of stir-fried Folium Eriobotryae, 6 parts of Radix Platycodonis, 6 parts of Semen Armeniacae Amarum and 6 parts of stir-fried Radix Glycyrrhizae. Preferably, the traditional Chinese medicine composition is composed of these raw materials.

As a preferred technical solution of the present application, the traditional Chinese medicine composition is administered orally.

In a second aspect, the present application further provides a preparation method for the traditional Chinese medicine composition described in the first aspect. The preparation method includes the following steps:

(1) separately pulverizing Radix Codonopsis, Rhizoma Atractylodis Macrocephalae, Poria cocos, Radix Ophiopogonis, Fructus Schisandrae Chinensis, Herba Agrimoniae, Fructus Perillae, Cortex Mori, Folium Eriobotryae, Radix Platycodonis, Semen Armeniacae Amarum and Radix Glycyrrhizae, which are in formulated amounts;

(2) extracting Radix Codonopsis by an ultrasonic countercurrent method to obtain an extract solution and medicine residues, and concentrating the extract solution to obtain a Radix Codonopsis extractum;

(3) mixing the medicine residues with Rhizoma Atractylodis Macrocephalae, Poria cocos, Radix Ophiopogonis, Fructus Schisandrae Chinensis, Herba Agrimoniae, Fructus Perillae, Cortex Mori, Folium Eriobotryae, Radix Platycodonis, Semen Armeniacae Amarum and Radix Glycyrrhizae and subjecting the mixture to decoction, impurity removal and concentration to obtain an aqueous extractum; and (4) mixing the aqueous extractum with the Radix Codonopsis extractum, adding a pharmaceutically acceptable excipient, formulating the mixture into granules, and dispensing the granules to obtain the traditional Chinese medicine composition.

The preparation method provided in the present application combines the ultrasonic countercurrent method with the decoction method and can fully extract effective ingredients in the raw materials and ensure their effects. Meanwhile, the traditional Chinese medicine composition is prepared by the method into the granules which are more convenient for patients to take.

As a preferred technical solution of the present application, in the preparation method, each component of traditional Chinese medicine is pulverized to 200-300 meshes, which may be, for example, 200 meshes, 210 meshes, 220 meshes, 230 meshes, 240 meshes, 250 meshes, 260 meshes, 270 meshes, 280 meshes, 290 meshes or 300 meshes, etc.

Preferably, a solvent used in the ultrasonic countercurrent method in step (2) is an aqueous solution of ethanol.

Preferably, the ultrasonic countercurrent method in step (2) is carried out at an extraction temperature of 50-80° C., which may be, for example, 52° C., 54° C., 56° C., 58° C., 60° C., 62° C., 64° C., 66° C., 68° C., 70° C., 72° C., 74° C., 76° C., 78° C. or 80° C., etc.

Preferably, the ultrasonic countercurrent method in step (2) is carried out at an ultrasonic frequency of 25-35 kHz which may be, for example, 35 kHz, 35 kHz, 35 kHz, 35 kHz, 35 kHz, 35 kHz, 35 kHz, 35 kHz, 35 kHz, 35 kHz or 35 kHz, etc. and an ultrasonic power of 18-22 kW, which may be, for example, 18 kW, 18.2 kW, 18.5 kW, 18.8 kW, 19 kW, 19.2 kW, 19.5 kW, 20 kW, 20.5 kW, 20.8 kW, 21 kW, 21.2 kW, 21.5 kW or 22 kW, etc.

As a preferred technical solution of the present application, the decoction is three-stage decoction.

Preferably, the three-stage decoction includes the following specific steps: a first stage carried out at a temperature of 60-80° C. which may be, for example, 60° C., 62° C., 64° C., 66° C., 68° C., 70° C., 72° C., 74° C., 76° C., 78° C. or 80° C., etc. for 5-10 min which may be, for example, 5 min, 5.5 min, 6 min, 7 min, 8 min, 8.5 min, 9 min or 10 min, etc.; a second stage carried out at a temperature of 90-100° C. which may be, for example, 90° C., 91° C., 92° C., 93° C., 94° C., 95° C., 96° C., 97° C., 98° C., 99° C. or 100° C., etc. for 6-8 min which may be, for example, 6 min, 6.2 min, 6.4 min, 6.6 min, 6.8 min, 7 min, 7.2 min, 7.4 min, 7.6 min, 7.8 min or 8 min, etc.; and a third stage carried out at a temperature of 50-60° C. which may be, for example, 50° C., 51° C., 52° C., 53° C., 54° C., 55° C., 56° C., 57° C., 58° C., 59° C. or 60° C., etc. for 5-10 min which may be, for example, 5 min, 5.5 min, 6 min, 7 min, 8 min, 8.5 min, 9 min or 10 min, etc.

Preferably, the pharmaceutically acceptable excipient includes any one or a combination of at least two of mannitol, sucrose, lactose, cyclodextrin or starch.

As a preferred technical solution of the present application, the preparation method includes the following steps:

(1) separately pulverizing Radix Codonopsis, Rhizoma Atractylodis Macrocephalae, Poria cocos, Radix Ophiopogonis, Fructus Schisandrae Chinensis, Herba Agrimoniae, Fructus Perillae, Cortex Mori, Folium Eriobotryae, Radix Platycodonis, Semen Armeniacae Amarum and Radix Glycyrrhizae, which are in formulated amounts, to 200-300 meshes;

(2) extracting Radix Codonopsis by an ultrasonic countercurrent method where a solvent used is an aqueous solution of ethanol, the extraction temperature is 50-80° C., the ultrasonic frequency is 25-35 kHz, and the ultrasonic power is 18-22 kW so as to obtain an extract solution and medicine residues, and concentrating the extract solution to obtain a Radix Codonopsis extractum;

(3) mixing the medicine residues with Rhizoma Atractylodis Macrocephalae, Poria cocos, Radix Ophiopogonis, Fructus Schisandrae Chinensis, Herba Agrimoniae, Fructus Perillae, Cortex Mori, Folium Eriobotryae, Radix Platycodonis, Semen Armeniacae Amarum and Radix Glycyrrhizae and subjecting the mixture to three-stage decoction, impurity removal and concentration to obtain an aqueous extractum; and (4) mixing the aqueous extractum with the Radix Codonopsis extractum, adding a pharmaceutically acceptable excipient, formulating the mixture into granules, and dispensing the granules to obtain the traditional Chinese medicine composition.

In a third aspect, the present application provides use of the traditional Chinese medicine composition described in the first aspect for preparing a medicament for rehabilitation of a fever disease caused by an exogenous pathogenic factor.

Preferably, the fever disease caused by an exogenous pathogenic factor comprises COVID-19.

Any numerical range described in the present application includes not only the above-listed point values but also any point values within the numerical range which are not listed. Due to the limitation of space and the consideration of simplicity, specific point values included in the range are not exhaustively listed in the present application.

Compared with the existing art, the present application has the beneficial effects described below.

The traditional Chinese medicine composition provided in the present application follows the formulation principle of "monarch, minister, assistant and guide" and combines 12 traditional Chinese medicines including Radix Codonopsis, Rhizoma Atractylodis Macrocephalae, Poria cocos, Radix Ophiopogonis, Fructus Schisandrae Chinensis, Herba Agrimoniae, Fructus Perillae, Cortex Mori, Folium Eriobotryae, Radix Platycodonis, Semen Armeniacae Amarum and Radix Glycyrrhizae. Traditional Chinese medicine components collaborate with each other and exert synergistic effects and the obtained traditional Chinese medicine composition has the effects of boosting Qi, nourishing Yin and eliminating residual pathogens and mainly treats Qi and Yin deficiency and residual pathogens in the recovery phase of COVID-19 and other fever diseases caused by an exogenous pathogenic factor. Moreover, the preparation method provided in the present application for the traditional Chinese medicine composition can fully extract effective ingredients in the raw materials and ensure their effects, and the traditional Chinese medicine composition is prepared by the method into the granules which are more convenient for patients to take.

DETAILED DESCRIPTION

Technical solutions of the present application are further described below through specific examples. Those skilled in the art are to understand that the examples described herein are used for a better understanding of the present application and are not to be construed as specific limitations to the present application.

In the following examples, traditional Chinese medicines can be purchased through conventional paths.

Example 1

This example provides a formulation of and a preparation method for a traditional Chinese medicine composition.

| Function | Name | Mass/g | Name | Mass/g | Name | Mass/g |
|---|---|---|---|---|---|---|
| Monarch | Radix Codonopsis | 10 | | | | |
| Minister | Roasted Rhizoma Atractylodis Macrocephalae | 10 | Poria cocos | 15 | Radix Ophiopogonis | 10 |
| | Fructus Schisandrae Chinensis | 6 | Herba Agrimoniae | 15 | | |
| Assistant | Fructus Perillae | 10 | Cortex Mori | 10 | Stir-fried Folium Eriobotryae | 12 |
| Guide | Radix Platycodonis | 6 | Semen Armeniacae Amarum | 6 | Stir-fried Radix Glycyrrhizae | 6 |

The preparation method is described below.

(1) Components in formulated amounts were separately pulverized to 200 meshes.

(2) Radix Codonopsis was extracted by an ultrasonic countercurrent method where the solvent used was an aqueous solution of ethanol, the extraction temperature was 60° C., the ultrasonic frequency was 30 kHz, and the ultrasonic power was 20 kW so as to obtain an extract solution and medicine residues, and the extract solution was concentrated to obtain a Radix Codonopsis extractum.

(3) The medicine residues were mixed with the other traditional Chinese medicines and subjected to decoction, impurity removal and concentration to obtain an aqueous extractum.

(4) The aqueous extractum was mixed with the Radix Codonopsis extractum, added with starch, formulated into granules, and dispensed to obtain the granules of the traditional Chinese medicine composition.

Example 2

This example provides a formulation of and a preparation method for a traditional Chinese medicine composition.

| Function | Name | Mass/g | Name | Mass/g | Name | Mass/g |
|---|---|---|---|---|---|---|
| Monarch | Radix Codonopsis | 20 | | | | |
| Minister | Roasted Rhizoma Atractylodis Macrocephalae | 1 | Poria cocos | 1 | Radix Ophiopogonis | 1 |
| | Fructus Schisandrae Chinensis | 10 | Herba Agrimoniae | 30 | | |
| Assistant | Fructus Perillae | 1 | Cortex Mori | 20 | Stir-fried Folium Eriobotryae | 1 |
| Guide | Radix Platycodonis | 1 | Semen Armeniacae Amarum | 1 | Stir-fried Radix Glycyrrhizae | 10 |

The preparation method is described below.

(1) Components in formulated amounts were separately pulverized to 300 meshes.

(2) Radix Codonopsis was extracted by an ultrasonic countercurrent method where the solvent used was an aqueous solution of ethanol, the extraction temperature was 50° C., the ultrasonic frequency was 35 kHz, and the ultrasonic power was 22 kW so as to obtain an extract solution and medicine residues, and the extract solution was concentrated to obtain a Radix Codonopsis extractum.

(3) The medicine residues were mixed with the other traditional Chinese medicines and subjected to decoction, impurity removal and concentration to obtain an aqueous extractum.

(4) The aqueous extractum was mixed with the Radix Codonopsis extractum, added with starch, formulated into granules, and dispensed to obtain the traditional Chinese medicine composition.

Example 3

This example provides a formulation of and a preparation method for a traditional Chinese medicine composition.

| Function | Name | Mass/g | Name | Mass/g | Name | Mass/g |
|---|---|---|---|---|---|---|
| Monarch | Radix Codonopsis | 1 | | | | |
| Minister | Roasted Rhizoma Atractylodis Macrocephalae | 20 | Poria cocos | 20 | Radix Ophiopogonis | 20 |
| | Fructus Schisandrae Chinensis | 1 | Herba Agrimoniae | 1 | | |
| Assistant | Fructus Perillae | 20 | Cortex Mori | 1 | Stir-fried Folium Eriobotryae | 25 |
| Guide | Radix Platycodonis | 10 | Semen Armeniacae Amarum | 10 | Stir-fried Radix Glycyrrhizae | 1 |

The preparation method is described below.

(1) Components in formulated amounts were separately pulverized to 250 meshes.

(2) Radix Codonopsis was extracted by an ultrasonic countercurrent method where the solvent used was an aqueous solution of ethanol, the extraction temperature was 80° C., the ultrasonic frequency was 25 kHz, and the ultrasonic power was 18 kW so as to obtain an extract solution and medicine residues, and the extract solution was concentrated to obtain a Radix Codonopsis extractum.

(3) The medicine residues were mixed with the other traditional Chinese medicines and subjected to decoction, impurity removal and concentration to obtain an aqueous extractum.

(4) The aqueous extractum was mixed with the Radix Codonopsis extractum, added with starch, formulated into granules, and dispensed to obtain the traditional Chinese medicine composition.

Example 4

This example provides a formulation of and a preparation method for a traditional Chinese medicine composition.

| Function | Name | Mass/g | Name | Mass/g | Name | Mass/g |
|---|---|---|---|---|---|---|
| Monarch | Radix Codonopsis | 5 | | | | |
| Minister | Roasted Rhizoma Atractylodis Macrocephalae | 5 | Poria cocos | 10 | Radix Ophiopogonis | 5 |
| | Fructus Schisandrae Chinensis | 5 | Herba Agrimoniae | 10 | | |
| Assistant | Fructus Perillae | 5 | Cortex Mori | 5 | Stir-fried Folium Eriobotryae | 10 |
| Guide | Radix Platycodonis | 5 | Semen Armeniacae Amarum | 5 | Stir-fried Radix Glycyrrhizae | 5 |

The preparation method is the same as that of Example 1.

Example 5

This example provides a formulation of and a preparation method for a traditional Chinese medicine composition.

| Function | Name | Mass/g | Name | Mass/g | Name | Mass/g |
|---|---|---|---|---|---|---|
| Monarch | Radix Codonopsis | 15 | | | | |
| Minister | Roasted Rhizoma Atractylodis Macrocephalae | 15 | Poria cocos | 20 | Radix Ophiopogonis | 15 |
| | Fructus Schisandrae Chinensis | 8 | Herba Agrimoniae | 20 | | |
| Assistant | Fructus Perillae | 15 | Cortex Mori | 15 | Stir-fried Folium Eriobotryae | 15 |
| Guide | Radix Platycodonis | 8 | Semen Armeniacae Amarum | 8 | Stir-fried Radix Glycyrrhizae | 8 |

The preparation method is the same as that of Example 1.

Performance Evaluation 1

Ten patients (deficient in Qi and Yin and carrying residual pathogens) in a recovery phase of coronavirus pneumonia were treated by using the granules prepared in Example 1, where the patients were 30-50 years old, six male patients and four female patients. Each patient was administered with the granules 10 g each time and twice a day. The results after two weeks are shown below.

1. Traditional Chinese Medicine Syndrome Evaluation

Main traditional Chinese medicine syndromes observed: changes of syndromes of the deficiency of Qi and Yin and residual pathogens: primary symptoms including cough, shortness of breath and fatigue; and, secondary symptoms including no sputum or little sticky sputum, sweating, dry mouth or dry pharynx, poor appetite, glomus and fullness, sloppy stool or constipation.

The changes of clinical symptoms were observed according to the scores in the "Guidelines for the Clinical Research of Chinese Medicine New Drugs".

a. Determination of effects on main symptoms: changes of primary symptoms such as cough, expectoration of phlegm and shortness of breath. The results are shown in Table 1.

Disappear: The symptoms disappear, which is scored 0.

Improved: The symptoms are relieved, with a reduced score not being 0.

Ineffective: The symptoms are not relieved or are aggravated, with the score not reduced.

TABLE 1

| Item | Disappear (Case) | Improved (Case) | Ineffective (Case) | Total Response Rate |
|---|---|---|---|---|
| Main indicator/person | 5 | 3 | 2 | 80.00% |

As can be seen from the above table, after administration with the granules provided in the present application for two weeks, the primary symptoms of five patients disappeared and the primary symptoms of three patients were improved, with an overall response rate of 80%.

b. Evaluation of effects on traditional Chinese medicine syndromes (score comparison)

Clinically controlled: The improvement rate of symptom score after treatment is greater than or equal to 95%.

Effective: The improvement rate of symptom score after treatment is greater than or equal to 70% and less than 95%.

Improved: The improvement rate of symptom score after treatment is greater than or equal to 30% and less than 70%.

Ineffective: The improvement rate of symptom score after treatment is less than 30%. The results are shown in Table 2.

TABLE 2

| Group | Pre-treatment | Post-treatment | P Value |
|---|---|---|---|
| Mean score | 41.1569 ± 6.0176 | 11.5093 ± 5.1467 | P < 0.05 |

As can be seen from the above table, after administration with the granules provided in Example 1, the post-treatment score is lower than the pre-treatment score, and the difference that P<0.05 has statistical significance.

2. Quality of Life Evaluation

The quality of life of patients before and after treatment was evaluated by using an SF-36 scale.

Each domain (physiological status, social/family status, emotional status, functional status, etc.) in the scale was evaluated at five levels: "none, little, some, much, too much", where positive items were directly scored 1-5, and negative items were scored inversely.

Scores of items included in each domain were summed up to obtain a score of this domain, and scores of each domain were summed up to obtain a score of the whole scale. The higher the score, the better the quality of life. The results are shown in Table 3. Statistical analysis was performed by using SPSS 22.0 statistical software, measurement data were represented as ($\bar{x}$±s). P<0.05, statistical significant. For self-comparison before and after treatment, paired t-test was used.

TABLE 3

| SF-36 Score | Comparison of SF-36 Scores Before and After Treatment ($\bar{x}$ ± s) | | |
|---|---|---|---|
| | Pre-treatment | Post-treatment | P Value |
| Physiological function(PF) | 86.80 ± 15.61 | 90.80 ± 12.04 | P < 0.05 |
| Role physical (RP) | 69.33 ± 35.20 | 88.33 ± 29.17 | P < 0.05 |
| Body pain (BP) | 63.40 ± 19.53 | 69.46 ± 19.02 | P < 0.05 |
| General health (GH) | 61.73 ± 18.40 | 68.28 ± 16.83 | P < 0.05 |
| Social function(SF) | 64.20 ± 16.29 | 78.28 ± 15.41 | P < 0.05 |
| Role emotional (RE) | 82.81 ± 17.83 | 88.29 ± 14.60 | P < 0.05 |
| Mental health (MH) | 88.66 ± 30.99 | 93.74 ± 20.00 | P < 0.05 |

As can be seen from the above table, through the comparison of the scores of quality of life, the post-treatment score is obviously higher than the pre-treatment score, indicating that the present application obviously improves the quality of life of patients.

Comparative Example 1

As a control, ten patients (including five male patients and five female patients and 25-59 years old) deficient in Qi and Yin and carrying residual pathogens in a recovery phase of coronavirus pneumonia were administered with a control formulation in clinics. The formulation included 10 g of Radix Codonopsis, 10 g of Radix Ophiopogonis, 6 g of Fructus Schisandrae Chinensis, 10 g of Poria cocos, 10 g of bamboo leaves, 30 g of raw gypsum (added at the end), 6 g of Rhizoma Pinelliae Preparata, 10 g of Pericarpium Citri Reticulatae, 10 g of Semen Armeniacae Amarum (roasted), 6 g of Radix Platycodonis, 20 g of Herba Agrimoniae, 15 g of Cortex Mori and 3 g of stir-fried Radix Glycyrrhizae. After two weeks of intervention, the results are shown below.

1. Traditional Chinese Medicine Syndrome Evaluation

Main traditional Chinese medicine syndromes observed: changes of syndromes of the deficiency of Qi and Yin and residual pathogens: primary symptoms including cough, shortness of breath and fatigue and secondary symptoms including no sputum or little sticky sputum, sweating, dry mouth or dry pharynx, poor appetite, glomus and fullness, sloppy stool or constipation.

The changes of clinical symptoms were observed according to the scores in the "Guidelines for the Clinical Research of Chinese Medicine New Drugs".

a. Determination of effects on main symptoms: changes of primary symptoms such as cough, expectoration of phlegm and shortness of breath. The results are shown in Table 4.

Disappear: The symptoms disappear, which is scored 0.

Improved: The symptoms are relieved, with a reduced score not being 0.

Ineffective: The symptoms are not relieved or are aggravated, with the score not reduced.

TABLE 4

| Item | Disappear (Case) | Improved (Case) | Ineffective (Case) | Total Response Rate |
|---|---|---|---|---|
| Primary symptoms | 3 | 3 | 4 | 60.00% |

As can be seen from the above table, after two weeks of treatment with the control formulation, the primary symptoms of three patients disappeared and the primary symptoms of three patients were improved, with an overall response rate of 60%.

b. Evaluation of effects on traditional Chinese medicine syndromes (score comparison)

Clinically controlled: The improvement rate of symptom score after treatment is greater than or equal to 95%.

Effective: The improvement rate of symptom score after treatment is greater than or equal to 70% and less than 95%.

Improved: The improvement rate of symptom score after treatment is greater than or equal to 30% and less than 70%.

Ineffective: The improvement rate of symptom score after treatment is less than 30%. The results are shown in Table 5.

TABLE 5

| Group | Pre-treatment | Post-treatment | P Value |
|---|---|---|---|
| Mean score | 42.3516 ± 4.3454 | 22.3862 ± 3.2850 | P < 0.05 |

As can be seen from the above table, after two weeks of treatment with the control formulation, the post-treatment score is lower than the pre-treatment score, and the difference that P<0.05 has statistical significance.

Performance Test 2

To further verify the therapeutic effect of the traditional Chinese medicine composition provided in the present application on patients deficient in Qi and Yin in a recovery phase of coronavirus pneumonia, the number of samples was further increased in this example, with 121 patients in hospital as treatment subjects.

A total of nine patients dropped out during the experiment for the following reasons: three patients were unable to continue the experiment for personal affairs, one patient was lost of follow-up with no reason specified, three patients withdrew for violating the experimental scheme, and three patients withdrew due to adverse reactions and adverse events.

In this example, test subjects were treated with the granules prepared in Example 1 for two weeks. Each patient was administered with the granules 10 g each time and three times a day and was not administered with other similar medicine. With the score reduction percentage of syndromes as a criterion, the changes of clinical symptoms of the subjects were observed with reference to the "Guidelines for the Clinical Research of Chinese Medicine New Drugs".

(1) The main outcomes of clinical effects were analyzed in this example by the method for evaluating effects on traditional Chinese medicine syndromes in Example 1, which is specifically described below.

Clinically controlled: The improvement rate of symptom score after treatment is greater than or equal to 95%.

Effective: The improvement rate of symptom score after treatment is greater than or equal to 70% and less than 95%.

Improved: The improvement rate of symptom score after treatment is greater than or equal to 30% and less than 70%.

Ineffective: The improvement rate of symptom score after treatment is less than 30%. The obtained score changes ($\bar{x} \pm s$) of traditional Chinese medicine syndromes before and after treatment are shown in Table 6.

TABLE 6

| Group | Pre-treatment | Post-treatment | P Value |
| --- | --- | --- | --- |
| Mean score | 14.56 ± 5.97 | 5.96 ± 4.26 | P < 0.05 |

In this example, the administration was performed for two weeks. With the score reduction percentage of syndromes as the criterion, it is obtained that the one-week clinically controlled rate was 0%, the one-week effective rate was 2.68%, the one-week improved rate was 41.07%, and the one-week ineffective rate was 56.25%. To sum up, the one-week overall response rate was 43.75%.

It is obtained that the two-week clinically controlled rate was 6.25%, the two-week effective rate was 32.14%, the two-week improved rate was 51.79%, and the two-week ineffective rate was 9.82%. To sum up, the two-week overall response rate was 90.18%.

(2) Safety evaluation: In this example, the changes of the following indicators of the subjects were observed before and after treatment: routine blood, urine and stool tests and liver and renal function tests in the laboratory and rates of adverse reactions.

I. Routine Blood Test

In this example, 86 patients underwent the entire routine blood test at the time of enrollment and completion.

53 cases were abnormal in the routine blood test at the time of enrollment and 55 cases were abnormal in the routine blood test at the time of completion.

Comparison of single patients before and after treatment: 14 cases had normal indicators in the routine blood test at the time of enrollment while abnormal indicators in the routine blood test at the time of completion. A statistical analysis was performed on the routine blood test data of 86 patients by a T-test method. The results are shown in Table 7 (where white blood cell 1 represents the level of detected white blood cells on the first day of enrollment, and white blood cell 14 represents the level of white blood cells on the 14th day of enrollment, that is, on the day of completion, so do other indicators).

TABLE 7

| | Indicator | Mean | N | Standard Deviation | Standard Error of Mean |
| --- | --- | --- | --- | --- | --- |
| Indicator 1 | White blood cell 1 | 5.8512 | 86 | 1.60197 | 0.17274 |
| | White blood cell 14 | 5.6421 | 86 | 1.42146 | 0.15328 |
| Indicator 2 | Neutrophil percentage 1 | 61.6844 | 86 | 7.48568 | 0.80720 |
| | Neutrophil percentage 14 | 60.0756 | 86 | 7.69837 | 0.83014 |
| Indicator 3 | Lymphocyte percentage 1 | 30.3372 | 86 | 8.03658 | 0.86661 |
| | Lymphocyte percentage 14 | 31.6570 | 86 | 7.81688 | 0.84292 |
| Indicator 4 | Absolute neutrophil count 1 | 3.6606 | 86 | 1.30124 | 0.14032 |
| | Absolute neutrophil count 14 | 3.4273 | 86 | 1.13930 | 0.12285 |
| Indicator 5 | Absolute lymphocyte count 1 | 1.7501 | 86 | 0.50572 | 0.05453 |
| | Absolute lymphocyte count 14 | 1.7951 | 86 | 0.59704 | 0.06438 |
| Indicator 6 | Erythrocyte count 1 | 4.5776 | 86 | 0.49736 | 0.05363 |
| | Erythrocyte count 14 | 4.5481 | 86 | 0.49442 | 0.05331 |
| Indicator 7 | Hemoglobin 1 | 141.2674 | 86 | 14.00708 | 1.51042 |
| | Hemoglobin 14 | 140.7907 | 86 | 13.66844 | 1.47391 |

Paired sample examination data are shown in Table 8.

TABLE 8

| | | | Paired Difference | | | | | |
| | | | | Standard | 95% Confidence Interval of Difference | | | | | |
| | Indicator | Mean | Standard deviation | Error of Mean | Lower Limit | Upper Limit | t | df | Sig.(Double-sided) |
|---|---|---|---|---|---|---|---|---|---|
| Indicator 1 | White blood cell 1-White blood cell 14 | 0.20907 | 0.96282 | 0.10382 | 0.00264 | 0.41550 | 2.014 | 85 | 0.047 |
| Indicator 2 | Neutrophil percentage 1-Neutrophil percentage 14 | 1.60884 | 5.42752 | 0.58526 | 0.44517 | 2.77250 | 2.749 | 85 | 0.007 |
| Indicator 3 | Lymphocyte percentage 1-Lymphocyte percentage 14 | −1.31977 | 6.87092 | 0.74091 | −2.79290 | 0.15336 | −1.781 | 85 | 0.078 |
| Indicator 4 | Absolute neutrophil count 1-Absolute neutrophil count 14 | 0.23326 | 0.87267 | 0.09410 | 0.04616 | 0.42036 | 2.479 | 85 | 0.015 |
| Indicator 5 | Absolute lymphocyte count 1-Absolute lymphocyte count 14 | −0.04500 | 0.36255 | 0.03909 | −0.12273 | 0.03273 | −1.151 | 85 | 0.253 |
| Indicator 6 | Erythrocyte count 1-Erythrocyte count 14 | 0.02942 | 0.16662 | 0.01797 | −0.00631 | 0.06514 | 1.637 | 85 | 0.105 |
| Indicator 7 | Hemoglobin 1-Hemoglobin 14 | 0.47674 | 5.05436 | 0.54503 | −0.60691 | 1.56040 | 0.875 | 85 | 0.384 |

As can be seen from the above table, before and after treatment, the changes in white blood cell and neutrophil percentage in the routine blood tests have statistical significance, $P<0.05$, and after treatment, the means of white blood cell and neutrophil percentage in the routine blood test are lower than those before treatment but are still within normal ranges.

II. Blood Biochemical Examination and Analysis

In this example, 92 patients underwent the entire blood biochemical examination at the time of enrollment and completion. 26 cases were abnormal in the blood biochemical examination at the time of enrollment and 21 cases were abnormal in the blood biochemical examination at the time of completion.

Comparison of single patients before and after treatment: 5 cases had normal indicators in the blood biochemical examination at the time of enrollment while abnormal indicators in the blood biochemical examination at the time of completion. A statistical analysis was performed on the blood biochemical examination data of 92 patients by a T-test method. The results are shown in Table 9.

TABLE 9

| | Indicator | Mean | N | Standard Deviation | Standard Error of Mean |
|---|---|---|---|---|---|
| Indicator 1 | Alanine transaminase 1 | 30.8043 | 92 | 20.24153 | 2.11033 |
| | Alanine transaminase 14 | 29.3043 | 92 | 19.53905 | 2.03709 |
| Indicator 2 | Aspartate transaminase 1 | 25.4674 | 92 | 8.62459 | 0.89918 |
| | Aspartate transaminase 14 | 24.8804 | 92 | 7.42855 | 0.77448 |
| Indicator 3 | Blood urea nitrogen 1 | 5.0283 | 92 | 1.41517 | 0.14754 |
| | Blood urea nitrogen 14 | 5.2652 | 92 | 1.22765 | 0.12799 |
| Indicator 4 | Creatinine 1 | 67.1283 | 92 | 19.65704 | 2.04939 |
| | Creatinine 14 | 69.1326 | 92 | 15.21276 | 1.58604 |

Paired sample examination data are shown in Table 10.

TABLE 10

| | | | | | Paired Difference | | | | |
| | | | | Standard | 95% Confidence Interval of Difference | | | | |
| | Indicator | Mean | Standard Deviation | Error of Mean | Lower Limit | Upper Limit | t | df | Sig. (Double-sided) |
|---|---|---|---|---|---|---|---|---|---|
| Indicator 1 | Alanine transaminase 1-Alanine transaminase 14 | 1.50000 | 15.27369 | 1.59239 | −1.66309 | 4.66309 | 0.942 | 91 | 0.349 |
| Indicator 2 | Aspartate transaminase 1-Aspartate transaminase 14 | 0.58696 | 5.93953 | 0.61924 | −0.64309 | 1.81700 | 0.948 | 91 | 0.346 |
| Indicator 3 | Blood urea nitrogen 1-Blood urea nitrogen 14 | −0.23696 | 1.14572 | 0.11945 | −0.47423 | .00032 | −1.984 | 91 | 0.050 |
| Indicator 4 | Creatinine 1 Creatinine 14 | −2.00435 | 11.08917 | 1.15613 | −4.30085 | 0.29215 | −1.734 | 91 | 0.086 |

As can be seen from the above table, before and after treatment, P≥0.05 for each indicator in the blood biochemical examination, and the difference has no statistical significance.

III. Routine Urine Test and Analysis

In this example, 88 patients underwent the entire routine urine test at the time of enrollment and completion. 39 cases were abnormal in the routine urine test at the time of enrollment and 38 cases were abnormal in the routine urine test at the time of completion.

Comparison of single patients before and after treatment: 9 cases had normal indicators in the routine urine test at the time of enrollment while abnormal indicators in the routine urine test at the time of completion. A statistical analysis was performed on the routine urine test data of 88 patients by a T-test method. The results are shown in Table 11.

TABLE 11

| | Indicator | Mean | N | Standard deviation | Standard Error of Mean |
|---|---|---|---|---|---|
| Indicator 1 | White blood cell 1 | 17.6591 | 88 | 77.45713 | 8.25696 |
| | White blood cell 14 | 12.0000 | 88 | 56.80032 | 6.05493 |
| Indicator 2 | Erythrocyte 1 | 0.2614 | 88 | 0.90331 | 0.09629 |
| | Erythrocyte 14 | 0.2614 | 88 | 0.79502 | 0.08475 |
| Indicator 3 | Occult blood 1 | 11.5341 | 88 | 34.50269 | 3.67800 |
| | Occult blood 14 | 15.3409 | 88 | 40.49120 | 4.31638 |
| Indicator 4 | Protein 1 | 0.0261 | 88 | 0.11890 | 0.01267 |

Paired sample examination data are shown in Table 12.

TABLE 12

| | | | | | Paired Difference | | | | |
| | | | | Standard | 95% Confidence Interval of Difference | | | | |
| | Indicator | Mean | Standard deviation | Error of Mean | Lower Limit | Upper Limit | t | df | Sig. (Double-sided) |
|---|---|---|---|---|---|---|---|---|---|
| Indicator 1 | White blood cell 1-White blood cell 14 | 5.65909 | 90.02131 | 9.59630 | −13.41460 | 24.73278 | 0.590 | 87 | 0.557 |
| Indicator 2 | Erythrocyte 1-Erythrocyte 14 | 0.00000 | 0.90972 | 0.09698 | −0.19275 | 0.19275 | 0.000 | 87 | 1.000 |
| Indicator 3 | Occult blood 1-Occult blood 14 | −3.80682 | 43.71403 | 4.65993 | −13.06894 | 5.45530 | −0.817 | 87 | 0.416 |
| Indicator 4 | Protein 1-Protein 14 | −0.27045 | 2.66941 | 0.28456 | −0.83605 | 0.29514 | −0.950 | 87 | 0.345 |

As can be seen from the above table, P≥0.05 for each indicator in the routine urine test, and the difference has no statistical significance.

IV. Routine Stool Analysis 28 patients underwent the entire routine stool test at the time of enrollment and completion. 16 cases were abnormal in the routine stool test at the time of enrollment and 1 case was abnormal in the routine stool test at the time of completion.

Comparison of single patients before and after treatment: 0 cases had normal indicators in the routine stool test at the time of enrollment while abnormal indicators in the routine stool test at the time of completion.

According to the above analysis of blood routine, urine routine, stool routine and liver and renal functions, the functions of bodies of the subjects were not obviously affected after the subjects were administered with the granules in the present application, and abnormal test items in the experimental process might be caused by the disease or the body differences of the subjects.

Therefore, the above safety evaluation experiment proves that the traditional Chinese medicine composition provided in the present application and in which the components follow the formulation principle of "monarch, minister, assistant and guide" causes no obvious adverse reactions and has relatively high safety for patients, especially those deficient in Qi and Yin in the recovery phase of COVID-19.

(3) According to the shorter version of the World Health Organization Quality of Life Measurement Scale (WHOQOL-Bref scale), secondary outcomes of clinical effects were analyzed, including scores of primary symptoms and body signs (before and after treatment and at follow-up) and quality of life evaluation.

I. Analysis of changes of scores of body signs: In this example, the effects on main symptoms were determined based on changes of primary symptoms such as cough, expectoration of phlegm and shortness of breath. The evaluation standards in this part are the same as those of Example 1 and specifically include the following:

Disappear: The symptoms disappear, which is scored 0.

Improved: The symptoms are relieved, with a reduced score not being 0.

Ineffective: The symptoms are not relieved or are aggravated, with the score not reduced. The obtained evaluation of effects on clinical symptoms and indicators is shown in Table 13.

TABLE 13

| Item | Disappear (Case) | Improved (Case) | Ineffective (Case) | Total Response Rate |
|---|---|---|---|---|
| Main indicator/person | 13 | 91 | 21 | 92.85% |

The obtained change ($\bar{x}\pm s$) of scores of primary symptoms and body signs before and after treatment is shown in Table 14.

TABLE 14

| Group | Pre-treatment | Post-treatment | P Value |
|---|---|---|---|
| Mean score | 10.44 ± 4.26 | 4.84 ± 3.67 | P < 0.05 |

As can be seen from the above table, after the use of granules, the score of primary symptoms and body signs of the patients is significantly reduced.

II. Quality of Life Evaluation

The quality of life of patients before and after treatment was evaluated by using the WHOQOL-Bref scale.

Each domain (physiological status, mental status, social score or environmental score) in the scale was evaluated at five levels: "none, little, some, much, too much", where positive items were directly scored 1-5, and negative items were scored inversely.

Scores of items included in each domain were summed up to obtain a score of this domain, and scores of each domain were summed up to obtain a score of the whole scale. The higher the score, the better the quality of life. The obtained results are shown in Table 15.

TABLE 15

| QOL Score | Comparison of QOL Scores Before and After Treatment ($\bar{x} \pm s$) | | |
|---|---|---|---|
| | Pre-treatment | Post-treatment | P Value |
| Physiological score (PF) | 20.62 ± 3.42 | 21.70 ± 2.90 | P < 0.05 |
| Mental score (RP) | 18.26 ± 2.99 | 18.29 ± 2.80 | P > 0.05 |
| Social score (BP) | 9.50 ± 2.058 | 9.60 ± 1.984 | P > 0.05 |
| Environmental score (GH) | 26.00 ± 7.16 | 25.43 ± 4.616 | P > 0.05 |

As can be seen from the above experimental results, the results after two weeks of treatment of 112 patients (deficient in Qi and Yin and carrying residual pathogens) in the recovery phase of COVID-19 with the granules of the traditional Chinese medicine composition of the present application show an overall response rate of 92.85%; through the comparison of scores of traditional Chinese medicine syndromes, the post-treatment score is lower than the pre-treatment score (P<0.05) and the difference has statistical significance; through the comparison of physiological scores in the quality of life scale, the pre-treatment score is lower than the post-treatment score (P<0.05) and the difference has statistical significance, while the differences before and after treatment have no statistical significance (P>0.05) in the aspects of metal, social and environmental scores. Therefore, the traditional Chinese medicine composition of the present application can improve the clinical symptoms and the quality of life of patients (deficient in Qi and Yin and carrying residual pathogens) in the recovery phase of COVID-19.

In conclusion, the traditional Chinese medicine composition of the present application can improve the clinical symptoms of patients in the recovery phase of a fever disease caused by an exogenous pathogenic factor represented by COVID-19, and the patients in the recovery phase who use the traditional Chinese medicine composition of the present application have excellent performance during traditional Chinese medicine syndrome evaluation or quality of life evaluation. Therefore, the traditional Chinese medicine composition provided in the present application can improve the quality of life of patients and provide medical assistance for the rehabilitation of the patients.

The applicant states that the above are only the embodiments of the present application and not intended to limit the protection scope of the present application. Those skilled in the art should understand that any changes or substitutions easily conceivable by those skilled in the art within the technical scope disclosed in the present application fall within the protection scope and the disclosed scope of the present application.

What is claimed is:

1. A medicine composition for a recovery phase of a fever disease caused by an exogenous pathogenic factor, wherein the medicine composition consists of the following parts by weight of materials:
 1-20 parts of Radix Codonopsis, 1-20 parts of roasted Rhizoma Atractylodis Macrocephalae, 1-30 parts of Poria cocos, 1-20 parts of Radix Ophiopogonis, 1-10 parts of Fructus Schisandrae Chinensis, 1-30 parts of Herba Agrimoniae, 1-20 parts of Fructus Perillae, 1-20 parts of Cortex Mori, 1-25 parts of stir-fried Folium Eriobotryae, 1-10 parts of Radix Platycodonis, 1-10 parts of Semen Armeniacae Amarum and 1-10 parts of stir-fried Radix Glycyrrhizae.

2. The medicine composition according to claim 1, wherein the medicine composition consists of the following parts by weight of raw materials:
 5-15 parts of Radix Codonopsis, 5-15 parts of roasted Rhizoma Atractylodis Macrocephalae, 10-20 parts of Poria cocos, 5-15 parts of Radix Ophiopogonis, 5-8 parts of Fructus Schisandrae Chinensis, 10-20 parts of Herba Agrimoniae, 5-15 parts of Fructus Perillae, 5-15 parts of Cortex Mori, 10-15 parts of stir-fried Folium Eriobotryae, 5-8 parts of Radix Platycodonis, 5-8 parts of Semen Armeniacae Amarum and 5-8 parts of stir-fried Radix Glycyrrhizae.

3. The medicine composition according to claim 2, wherein the medicine composition consists of the following parts by weight of raw materials:
 the traditional Chinese medicine composition is made of the following parts by weight of raw materials: 10 parts of Radix Codonopsis, 10 parts of roasted Rhizoma Atractylodis Macrocephalae, 15 parts of Poria cocos, 10 parts of Radix Ophiopogonis, 6 parts of Fructus Schisandrae Chinensis, 15 parts of Herba Agrimoniae, 10 parts of Fructus Perillae, 10 parts of Cortex Mori, 12 parts of stir-fried Folium Eriobotryae, 6 parts of Radix Platycodonis, 6 parts of Semen Armeniacae Amarum and 6 parts of stir-fried Radix Glycyrrhizae.

* * * * *